(12) United States Patent
Ma et al.

(10) Patent No.: US 11,468,236 B2
(45) Date of Patent: Oct. 11, 2022

(54) METHOD AND APPARATUS FOR PERFORMING WORD SEGMENTATION ON TEXT, DEVICE, AND MEDIUM

(71) Applicant: Baidu Online Network Technology (Beijing) Co., Ltd., Beijing (CN)

(72) Inventors: Dongmin Ma, Beijing (CN); Ben Xu, Beijing (CN); Xiujian Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/020,166

(22) Filed: Sep. 14, 2020

(65) Prior Publication Data

US 2021/0216710 A1    Jul. 15, 2021

(30) Foreign Application Priority Data

Jan. 14, 2020 (CN) .......................... 202010037943.7

(51) Int. Cl.
  *G06F 40/279* (2020.01)
(52) U.S. Cl.
  CPC .................................. *G06F 40/279* (2020.01)
(58) Field of Classification Search
  CPC ........................... G06F 40/279; G06F 16/3344
  USPC .......................................................... 704/9
  See application file for complete search history.

(56) References Cited

U.S. PATENT DOCUMENTS

2021/0110586 A1* 4/2021 Gopalakrishnan .......................... G06K 9/00456

FOREIGN PATENT DOCUMENTS

| JP | 2013-545160 A | 12/2013 |
| JP | 2016-31572 A | 3/2016 |

OTHER PUBLICATIONS

Japanese Office Action for Japanese Application No. 2020-159812, dated Mar. 29, 2022, 4 pages.

* cited by examiner

*Primary Examiner* — Thierry L Pham
(74) *Attorney, Agent, or Firm* — Seed IP Law Group LLP

(57) ABSTRACT

Embodiments of the present disclosure provide a method and apparatus for performing word segmentation on a text, a device and a medium, which relate to the field of data processing technology and particularly to a smart search technology. The method may include: dividing a to-be-segmented text into at least two layers of character fragment combinations, any layer of character fragments being child character fragments of a previous layer of character fragments and/or parent character fragments of a next layer of character fragments; and segmenting the to-be-segmented text according to a target word granularity based on the at least two layers of character fragment combinations.

13 Claims, 4 Drawing Sheets

S110

Dividing a to-be-segmented text into at least two layers of character fragment combinations; where any layer of character fragments are child character fragments of a previous layer of character fragments and/or parent character fragments of a next layer of character fragments

S120

Segmenting the to-be-segmented text according to a target word granularity based on the at least two layers of character fragment combinations

METHOD AND APPARATUS FOR PERFORMING WORD SEGMENTATION ON TEXT, DEVICE, AND MEDIUM

CROSS-REFERENCE TO RELATED APPLICATIONS

This application claims priority to Chinese Patent Application No. 202010037943.7, filed on Jan. 14, 2020, titled "Method and apparatus for performing word segmentation on text, device and medium," which is hereby incorporated by reference in its entirety.

TECHNICAL FIELD

Embodiments of the present disclosure relate to the field of data processing technology, and particularly to a smart search technology. Specifically, the embodiments of the present disclosure provide a method and apparatus for performing word segmentation on a text, a device and a medium.

BACKGROUND

In natural language processing, word segmentation is an important basic task. The accuracy of the word segmentation directly affects other subsequent tasks such as classification, sequence annotation, retrieval and sorting.

The existing word segmentation scheme mainly refers to that the word segmentation is performed according to a matching result obtained by matching a vocabulary.

However, in the above scheme, there is only segmentation of one word granularity that can be performed on the to-be-segmented text.

SUMMARY

Embodiments of the present disclosure provide a method and apparatus for performing word segmentation on a text, a device and a medium, to realize segmentation of different word granularities on a text.

An embodiment of the present disclosure provides a method for performing word segmentation on a text, including: dividing a to-be-segmented text into at least two layers of character fragment combinations, any layer of character fragments being child character fragments of a previous layer of character fragments and/or parent character fragments of a next layer of character fragments; and segmenting the to-be-segmented text according to a target word granularity based on the at least two layers of character fragment combinations.

According to the embodiment of the present disclosure, the to-be-segmented text is divided into at least two layers of character fragment combinations, and the to-be-segmented text is segmented according to the target word granularity based on the at least two layers of character fragment combinations. Since the lengths of character fragments in each layer of character fragment combinations are different, according to the embodiment of the present disclosure, segmentation of different word granularities on the to-be-segmented text may be implemented based on the divided at least two layers of character fragment combinations.

Further, the dividing the to-be-segmented text into at least two layers of character fragment combinations includes: extracting candidate character fragments of at least one kind of length from the previous layer of character fragments, the previous layer of character fragments belonging to a previous layer of character fragment combination; combining the extracted candidate character fragments to obtain candidate character fragment combinations; and determining a current layer of character fragment combination from the candidate character fragment combinations according to an overlapping relationship between the candidate character fragments and historical usage information of the candidate character fragments, the current layer of character fragment combination including at least one character fragment of the current layer.

Based on these technical features, in the embodiment of the present disclosure, the candidate character fragments of the at least one kind of length are extracted, the extracted candidate character fragments are combined, and the current layer of character fragment combination is determined from the candidate character fragment combinations according to the overlapping relationship between the candidate character fragments and the historical usage information of the candidate character fragments, and thus, the division for the various layers of character fragment combinations of the to-be-segmented text is implemented.

In addition, in the embodiment of the present disclosure, the various layers of character fragment combinations are determined according to the overlapping relationship between the candidate character fragments and the historical usage information of the candidate character fragments, and the process is independent of a vocabulary. Thus, according to the embodiment of the present disclosure, the segmentation for a word unrecorded in the vocabulary may be implemented based on the combination of the various layers of the character fragments.

Further, the determining the current layer of character fragment combination from the candidate character fragment combinations according to the overlapping relationship between the candidate character fragments and historical usage information of the candidate character fragments includes: filtering a candidate character fragment combination having an overlap from the candidate character fragment combinations, to obtain target character fragment combinations; and determining the current layer of character fragment combination from the target character fragment combinations according to a number of candidate character fragments included in the target character fragment combinations and historical usage information of the candidate character fragments.

Based on these technical features, in the embodiment of the present disclosure, the candidate character fragment combination having an overlap is filtered from the candidate character fragment combinations, to obtain the target character fragment combinations, and the current layer of character fragments are determined from the target character fragment combinations according to the number of the candidate character fragments included in the target character fragment combinations and the historical usage information of the candidate character fragments. Thus, it is implemented that the current layer of character fragments are determined according to the overlapping relationship between the candidate character fragments and the historical usage information of the candidate character fragments.

Further, the determining the current layer of character fragment combination from the target character fragment combinations according to the number of candidate character fragments included in the target character fragment combinations and historical usage information of the candidate character fragments includes: calculating an information entropy of the candidate character fragments according to historical adjacent character information of the candidate character fragments; determining weights of the target character fragment combinations according to the calculated information entropy; and determining the current layer of character fragment combination from the target character fragment combinations according to the number of the candidate character fragments included in the target character fragment combinations and the weights of the target character fragment combinations.

Based on these technical features, in the embodiment of the present disclosure, the information entropy of the candidate character fragments is calculated according to the historical adjacent character information of the candidate character fragments; the weights of the target character fragment combinations are determined according to the calculated information entropy; and the current layer of character fragment combinations are determined from the target character fragment combinations according to the number of the candidate character fragments included in the target character fragment combinations and the weights of the target character fragment combinations. Thus, it is implemented that the current layer of character fragment combination is determined according to the number of the candidate character fragments included in the target character fragment combinations and the historical usage information of the candidate character fragments.

In addition, the information entropy of the candidate character fragments is calculated according to the historical adjacent character information of the candidate character fragments; and the weights of the target character fragment combinations are determined according to the calculated information entropy, such that the calculated weights include cohesion information in the target character fragment combinations. Therefore, the accuracy of the determination for a word boundary is improved, thus improving the accuracy of the word segmentation for the text.

Further, the segmenting the to-be-segmented text according to the target word granularity based on the at least two layers of character fragment combinations includes: determining target segmentation fragments from character fragments of the character fragment combinations according to historical usage information of character fragments in the character fragment combinations and a parent-child relationship between character fragments in different character fragment combinations; and combining the target segmentation fragments, and segmenting the to-be-segmented text according to the target word granularity based on the combination of target segmentation fragments.

Based on these technical features, in the embodiment of the present disclosure, the target segmentation fragment is determined from the character fragments of the character fragment combinations according to the historical usage information of the character fragments in the character fragment combinations and the parent-child relationship between the character fragments in different character fragment combinations. Thus, the determination for an optimal segmentation word granularity is implemented. Further, based on the optimal segmentation word granularity, accurate segmentation on the to-be-segmented text may be implemented.

Further, the determining target segmentation fragments from character fragments of the character fragment combinations according to historical usage information of character fragments in the character fragment combination and a parent-child relationship between character fragments in different character fragment combinations includes: determining, according to historical usage information of a parent character fragment in the character fragment combinations, a weight of the parent character fragment; determining, according to historical usage information of a child character fragment associated with the parent character fragment, a comprehensive weight of the child character fragment; and comparing the weight of the parent character fragment with the comprehensive weight of the child character fragment; and terminating a traversal for a branch to which the parent character fragment belongs and using the child character fragment associated with the parent character fragment as the target segmentation fragment, in response to the weight of the parent character fragment is greater than the comprehensive weight of the child character fragment.

Based on these technical features, in the embodiment of the present disclosure, the weight of the parent character fragment is compared with the comprehensive weight of the child character fragment; and the traversal for the branch to which the parent character fragment belongs is terminated and the child character fragment associated with the parent character fragment is used as the target segmentation fragment, if the weight of the parent character fragment is greater than the comprehensive weight of the child character fragment. Thus, the determination for the optimal segmentation word granularity is implemented.

Further, after segmenting the to-be-segmented text, the method further includes: comparing a target segmentation word obtained through the segmentation with an existing segmentation word, the existing segmentation word being obtained by segmenting the to-be-segmented text based on an existing word segmentation logic; and determining a to-be-mined word from the target segmentation word according to a comparison result.

Based on these technical features, in the embodiment of the present disclosure, the target segmentation word obtained through the segmentation is compared with the existing segmentation word; and the to-be-mined word is determined from the target segmentation word according to the comparison result. Thus, the mining for a new word is implemented.

Further, an embodiment of the present disclosure provides an apparatus for performing word segmentation on a text, including: a text dividing module, configured to divide a to-be-segmented text into at least two layers of character fragment combinations, any layer of character fragments being child character fragments of a previous layer of character fragments and/or parent character fragments of a next layer of character fragments; and a text segmenting module, configured to segment the to-be-segmented text according to a target word granularity based on the at least two layers of character fragment combinations.

Further, the text segmenting module includes: a fragment extracting unit, configured to extract candidate character fragments of at least one kind of length from the previous layer of character fragments, the previous layer of character fragments belonging to a previous layer of character fragment combination; a fragment combining unit, configured to combine the extracted candidate character fragments to obtain candidate character fragment combinations; and a combination determining unit, configured to determine a current layer of character fragment combination from the candidate character fragment combinations according to an overlapping relationship between the candidate character fragments and historical usage information of the candidate character fragments, the current layer of character fragment combination including at least one character fragment of the current layer.

Further, the combination determining unit includes: a combination filtering subunit, configured to filter a candidate character fragment combination having an overlap from the candidate character fragment combinations, to obtain target character fragment combinations; and a combination determining subunit, configured to determine the current layer of character fragment combination from the target character fragment combinations according to a number of candidate character fragments included in the target character fragment combinations and historical usage information of the candidate character fragments.

Further, the combination determining subunit is specifically configured to: calculate an information entropy of the candidate character fragments according to historical adjacent character information of the candidate character fragments; determine weights of the target character fragment combinations according to the calculated information entropy; and determine the current layer of character fragment combination from the target character fragment combinations according to the number of the candidate character fragments included in the target character fragment combinations and the weights of the target character fragment combinations.

Further, the text segmenting module includes: a segmentation fragment determining unit, configured to determine target segmentation fragments from the character fragment combinations according to historical usage information of character fragments in the character fragment combinations and a parent-child relationship between character fragments in different character fragment combinations; and a text segmenting unit, configured to combine the target segmentation fragments, and segment the to-be-segmented text according to the target word granularity based on the combination of target segmentation fragments.

Further, the segmentation fragment determining unit includes: a first weight subunit, configured to determine, according to historical usage information of a parent character fragment in the character fragment combinations, a weight of the parent character fragment; a second weight subunit, configured to determine, according to historical usage information of a child character fragment associated with the parent character fragment, a comprehensive weight of the child character fragment; and a segmentation fragment determining subunit, configured to compare the weight of the parent character fragment with the comprehensive weight of the child character fragment; and terminate a traversal for a branch to which the parent character fragment belongs and use the child character fragment associated with the parent character fragment as the target segmentation fragment, in response to the weight of the parent character fragment is greater than the comprehensive weight of the child character fragment.

Further, the apparatus further includes: a word comparing module, configured to, after the to-be-segmented text is segmented, compare a target segmentation word obtained through the segmentation with an existing segmentation word, the existing segmentation word being obtained by segmenting the to-be-segmented text based on an existing word segmentation logic; and a word mining module, configured to determine a to-be-mined word from the target segmentation word according to the comparison result.

An embodiment of the present disclosure provides an electronic device, including: at least one processor; and a memory, communicatively connected with the at least one processor, where the memory stores instructions executable by the at least one processor, and the instructions when executed by the at least one processor, cause the at least one processor to perform the method of any embodiment of the present disclosure.

An embodiment of the present disclosure provides a non-transitory computer readable storage medium, storing computer instructions, where the computer instructions is used to cause a computer to perform the method of any embodiment of the present disclosure.

BRIEF DESCRIPTION OF THE DRAWINGS

Accompanying drawings are used for a better understanding of the solution, and do not constitute a limitation to the present disclosure.

DETAILED DESCRIPTION OF EMBODIMENTS

Example embodiments of the present disclosure are described below in combination with accompanying drawings, and various details of embodiments of the present disclosure are included in the description to facilitate understanding, and should be considered as exemplary only. Accordingly, it should be recognized by one of ordinary skill in the art that various changes and modifications may be made to embodiments described herein without departing from the scope and spirit of the present disclosure. Also, for clarity and conciseness, descriptions for well-known functions and structures are omitted in the following description.

First Embodiment

Figure 1:
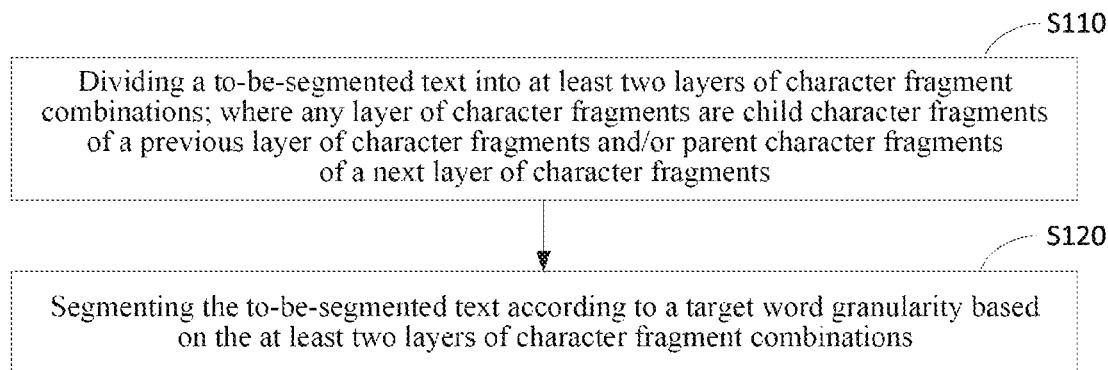
FIG. 1 is a flowchart of a method for performing word segmentation on a text provided by a first embodiment of the present disclosure.

FIG. 1 is a flowchart of a method for performing word segmentation on a text provided by the first embodiment of the present disclosure. This embodiment may be applicable to a situation where word segmentation is performed on a text. Typically, the embodiment of the present disclosure may be applicable to a situation where word segmentation is performed on a to-be-retrieved text. The method may be performed by an apparatus for performing word segmentation on a text, and the apparatus may be implemented by means of software and/or hardware. Referring to FIG. 1, the method for performing word segmentation on a text provided by the embodiment of the present disclosure includes the following steps.

S110, dividing a to-be-segmented text into at least two layers of character fragment combinations. Here, any layer of character fragments are child character fragments of a previous layer of character fragments and/or parent character fragments of a next layer of character fragments.

A character fragment combination includes at least one character fragment, each character fragment being determined by one character or at least two adjacent characters in the to-be-segmented text.

Each character fragment represents a word of one kind of length.

The to-be-segmented text may be obtained by stitching at least two character fragments in each layer of character fragment combination. Moreover, there is no overlap between the stitched two character fragments.

Specifically, the segmentation for at least two layers of character fragment combinations may be performed on the to-be-segmented text, according to words of different granularities in a vocabulary.

Figure 2:
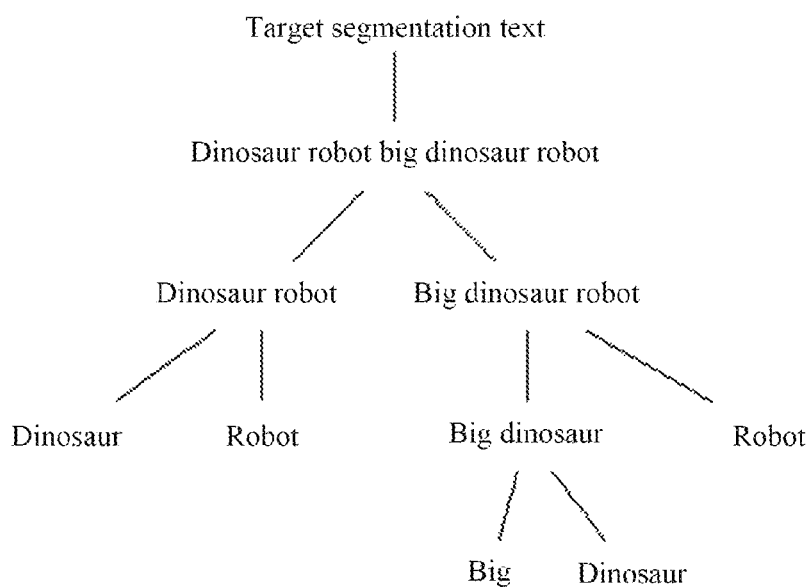
FIG. 2 is a schematic diagram of hierarchical division for a to-be-segmented text provided by the first embodiment of the present disclosure.

For example, referring to FIG. 2, if the to-be-segmented text is: "dinosaur robot big dinosaur robot", the segmented at least two layers of character fragment combinations are: (dinosaur robot, big dinosaur robot); (dinosaur, robot, big dinosaur, robot); and (dinosaur, robot, big, dinosaur, robot).

S120, segmenting the to-be-segmented text according to a target word granularity based on the at least two layers of character fragment combinations.

Here, the target word granularity refers to a to-be-segmented word granularity.

Specifically, the segmenting the to-be-segmented text according to a target word granularity based on the at least two layers of character fragment combinations includes: determining a combination from the at least two layers of character fragment combinations according to the target word granularity, and segmenting the to-be-segmented text according to the respective character fragments in the combination.

According to the embodiment of the present disclosure, the to-be-segmented text is divided into at least two layers of character fragment combinations, and the to-be-segmented text is segmented according to the target word granularity based on the at least two layers of character fragment combinations. Since the length of a character fragment in each layer of character fragment combination is different, according to the embodiment of the present disclosure, segmentation of different word granularities on the to-be-segmented text may be implemented based on the divided at least two layers of character fragment combinations.

To implement mining for a new word, after segmenting the to-be-segmented text, the method further includes: comparing a target segmentation word obtained through the segmentation with an existing segmentation word, the existing segmentation word being obtained by segmenting the to-be-segmented text based on an existing word segmentation logic; and determining a to-be-mined word from the target segmentation word according to a comparison result.

Second Embodiment

Figure 3:
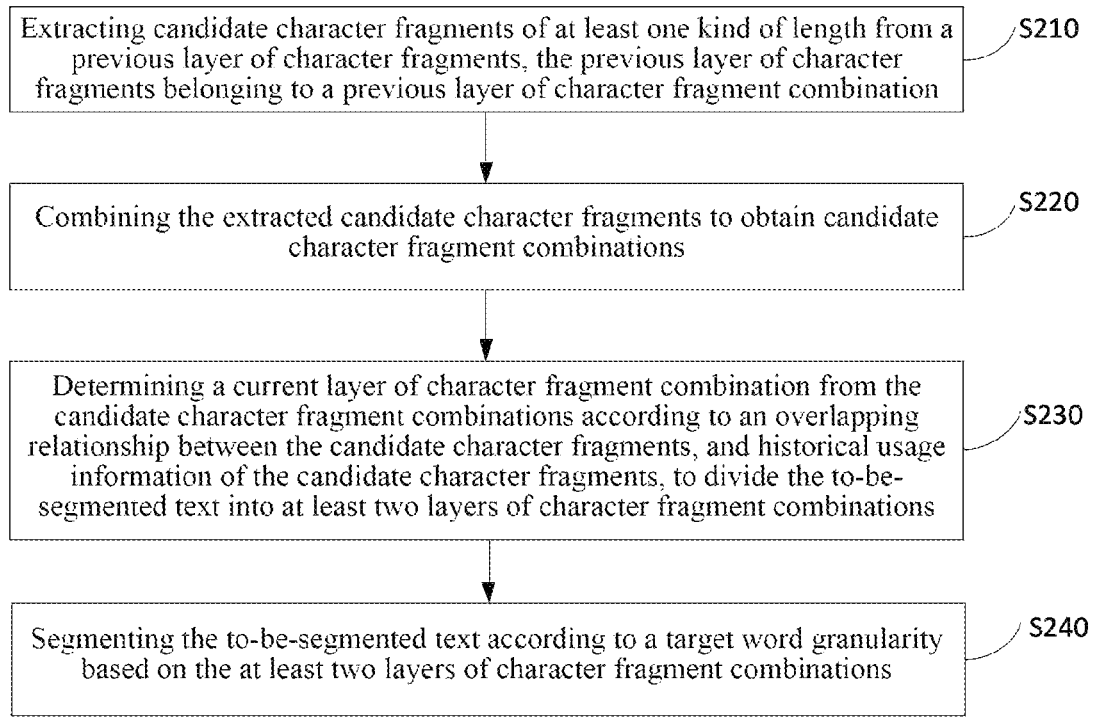
FIG. 3 is a flowchart of a method for performing word segmentation on a text provided by a second embodiment of the present disclosure.

FIG. 3 is a flowchart of a method for performing word segmentation on a text provided by the second embodiment of the present disclosure. This embodiment is an alternative solution proposed on the basis of the above embodiment. Referring to FIG. 3, the method for performing word segmentation on text provided by the embodiment of the present disclosure includes the following steps.

S210, extracting candidate character fragments of at least one kind of length from a previous layer of character fragments, the previous layer of character fragments belonging to a previous layer of character fragment combination.

Specifically, the previous layer of character fragments may be determined by dividing to-be-segmented text.

Specifically, the extraction for the candidate character fragments of at least one kind of length may be achieved through an n-gram algorithm.

S220, combining the extracted candidate character fragments to obtain candidate character fragment combinations.

Specifically, the extracted candidate character fragments are combined according to a connection relationship between words in the to-be-segmented text, to obtain the candidate character fragment combinations.

S230, determining a current layer of character fragment combination from the candidate character fragment combinations according to an overlapping relationship between the candidate character fragments, and historical usage information of the candidate character fragments, to divide the to-be-segmented text into at least two layers of character fragment combinations, where the current layer of character fragment combination includes at least one character fragment of current layer.

Specifically, the overlapping relationship between the candidate character fragments includes: there being an overlap between the candidate character fragments, and there being no overlap between the candidate character fragments.

The historical usage information includes: a total frequency of occurrence, a frequency of occurring as a separate sentence, and adjacent character information.

The adjacent character information includes: an adjacent character, and occurrence information of the adjacent character.

Specifically, the determining a current layer of character fragment combination from the candidate character fragment combinations according to an overlapping relationship between the candidate character fragments, and historical usage information of the candidate character fragments includes: filtering a candidate character fragment combination having an overlap, to obtain target character fragment combination(s); and determining the current layer of character fragment combination from the target character fragment combination(s) according to a number of candidate character fragments included in the target character fragment combinations and historical usage information of the candidate character fragments.

For example, the to-be-segmented text is: I love listening to Zhang San's comic dialogue. The candidate character fragments include, but not limited to: I, I love, love listening to, listening to Zhang San, listening to Zhang, Zhang San's, San's, comic dialogue, comic and dialogue. The candidate character fragment combinations may include: (I, love listening to, Zhang San's, comic dialogue), (I love, love listening to, Zhang San's, comic dialogue), (I, listening to Zhang San, comic dialogue), and (I love, listening to Zhang, Zhang San's, comic dialogue). Since there is an overlap "love" in (I love, love listening to, Zhang San's, comic dialogue), and there is an overlap "Zhang" in (I love, listening to Zhang, Zhang San's, comic dialogue), the character fragment combinations (I love, love listening to, Zhang San's, comic dialogue) and (I love, listening to Zhang, Zhang San's, comic dialogue) are filtered out from the candidate character fragment combinations.

Specifically, the determining the current layer of character fragment combination from the target character fragment combination according to the number of candidate character fragments included in the target character fragment combination and historical usage information of the candidate character fragments includes: calculating an information entropy of the candidate character fragments according to historical adjacent character information of the candidate character fragments; determining weights of the target character fragment combinations according to the calculated information entropy; and determining the current layer of character fragment combination from the target character fragment combinations according to the number of the candidate character fragments included in the target character fragment combinations and the weights of the target character fragment combinations.

Specifically, the determining the combination of the current layer of character fragments from the target character fragment combinations according to the number of the candidate character fragments included in the target character fragment combinations and the weights of the target character fragment combinations includes: using a target character fragment combination, having the highest weight and including the minimum number of character fragments, in the target character fragment combinations as the current layer of character fragment combination.

S240, segmenting the to-be-segmented text according to a target word granularity based on the at least two layers of character fragment combinations.

According to the embodiment of the present disclosure, the candidate character fragments of at least one kind of length are extracted, the extracted candidate character fragments are combined, and the current layer of character fragment combination is determined from the candidate character fragment combinations according to the overlapping relationship between the candidate character fragments and the historical usage information of the candidate character fragments, and thus, the division for the various layers of character fragment combinations of the to-be-segmented text is implemented.

In addition, in the embodiment of the present disclosure, the various layers of character fragment combinations are determined according to the overlapping relationship between the candidate character fragments and the historical usage information of the candidate character fragments, and the process is independent of a vocabulary. Thus, according to the embodiment of the present disclosure, the segmentation for a word unrecorded in the vocabulary may be implemented based on the various layers of the character fragments.

Third Embodiment

Figure 4:
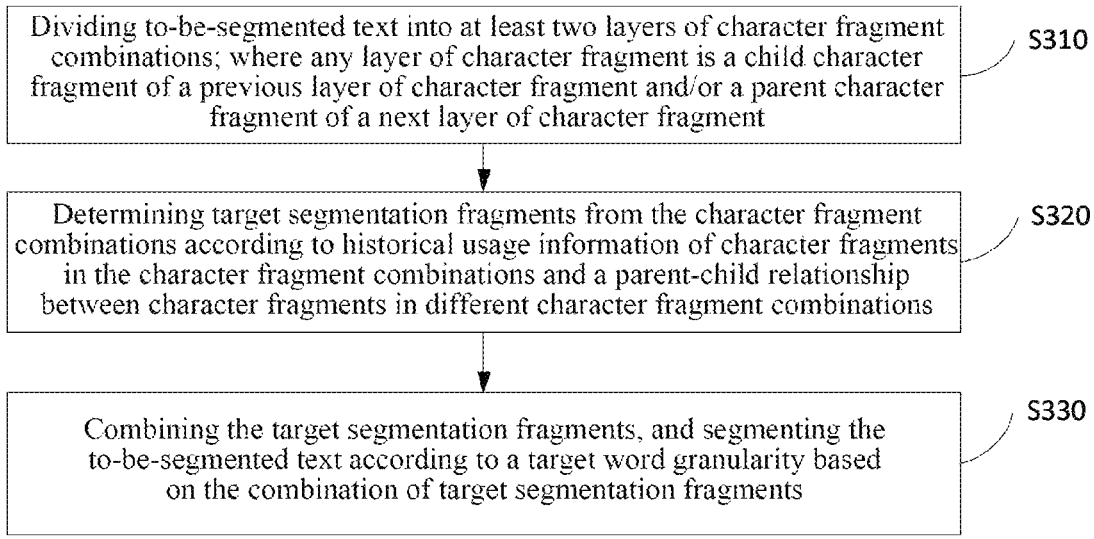
FIG. 4 is a flowchart of a method for performing word segmentation on a text provided by a third embodiment of the present disclosure.

FIG. 4 is a flowchart of a method for performing word segmentation on a text provided by the third embodiment of the present disclosure. This embodiment is an alternative solution proposed on the basis of the above embodiments. Referring to FIG. 4, the method for performing word segmentation on a text provided by the embodiment of the present disclosure includes the following steps.

S310, dividing to-be-segmented text into at least two layers of character fragment combinations. Here, any layer of character fragment is a child character fragment of a previous layer of character fragment and/or a parent character fragment of a next layer of character fragment.

S320, determining target segmentation fragments from the character fragment combinations according to historical usage information of character fragments in the character fragment combinations and a parent-child relationship between character fragments in different character fragment combinations.

Here, the target segmentation fragment refers to a character fragment as a segmentation basis.

Specifically, the determining a target segmentation fragment from the character fragments combinations according to historical usage information of character fragments in the character fragment combinations and a parent-child relationship between character fragments in different character fragment combinations includes: determining, according to historical usage information of a parent character fragment in the character fragment combinations, a weight of the parent character fragment; determining, according to historical usage information of a child character fragment associated with the parent character fragment, a comprehensive weight of the child character fragment; and comparing the weight of the parent character fragment with the comprehensive weight of the child character fragment; and terminating a traversal for a branch to which the parent character fragment belongs and using the child character fragment associated with the parent character fragment as the target segmentation fragment, in response to the weight of the parent character fragment being greater than the comprehensive weight of the child character fragment.

Here, the weight of the parent character fragment represents the possibility that the parent character fragment is served as one word alone.

The comprehensive weight of the child character fragment represents the possibility that the child character fragment is served as one word alone.

Specifically, the determining, according to historical usage information of the parent character fragment in the character fragment combinations, the weight of the parent character fragment includes: determining the weight of the parent character fragment according to a frequency at which the parent character fragment historically occurs as a sentence alone.

The determining, according to historical usage information of the child character fragment associated with the parent character fragment, the comprehensive weight of the child character fragment includes: determining the comprehensive weight of the child character fragment according to a frequency at which the child character fragment associated with the parent character fragment historically occurs as a sentence alone.

Alternatively, the comprehensive weight of the child character fragment may also be determined according to a historical frequency of occurrence and/or historical adjacent character information of the child character fragment. The embodiment does not impose any limitation on this.

S330, combining the target segmentation fragments, and segmenting the to-be-segmented text according to a target word granularity based on the combination of target segmentation fragments.

According to the technical solution of the embodiment of the present disclosure, the target segmentation fragments are determined from the character fragment combinations according to the historical usage information of the character fragments in the character fragment combinations and the parent-child relationship between the character fragments in different character fragment combinations. Thus, the determination for an optimal segmentation word granularity is realized. Further, based on the optimal segmentation word granularity, accurate segmentation on the to-be-segmented text may be implemented.

Fourth Embodiment

Figure 5:
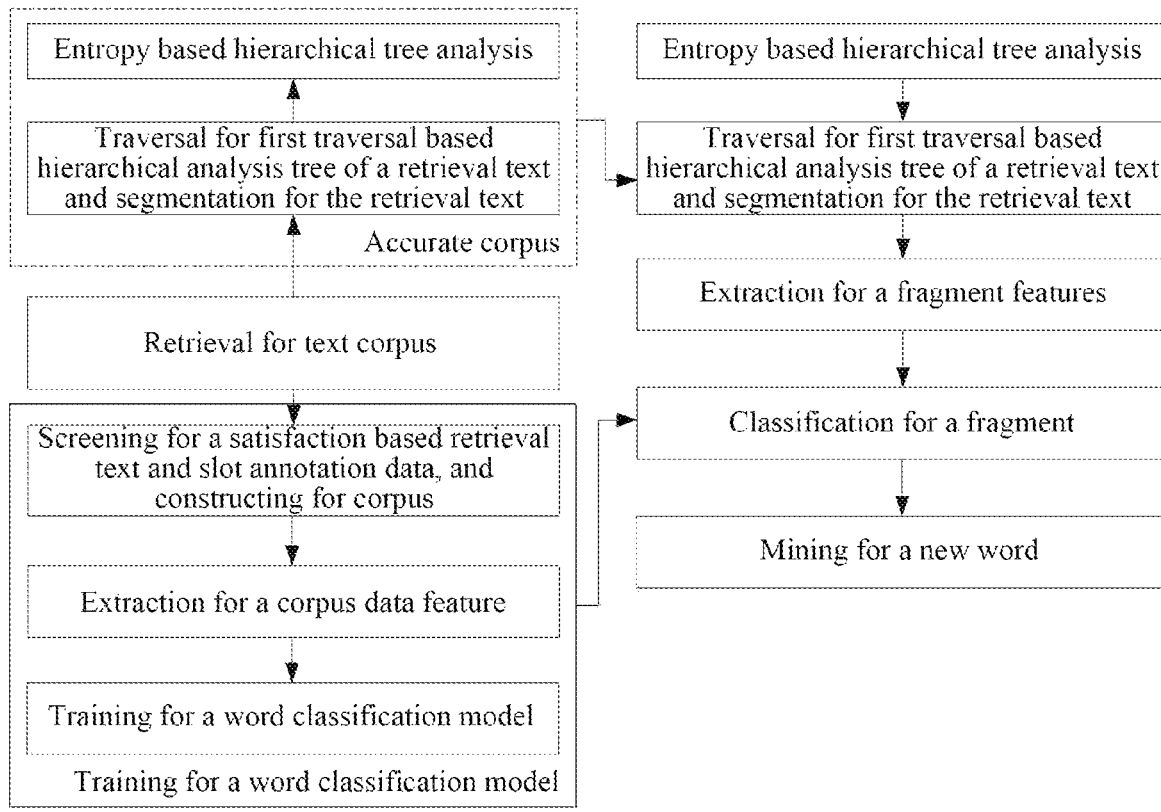
FIG. 5 is a flowchart of a method for mining a new word provided by a fourth embodiment of the present disclosure.

FIG. 5 is a flowchart of a method for mining a new word provided by the fourth embodiment of the present disclosure. On the basis of the above embodiments, this embodiment is an alternative application solution proposed to apply the method for performing word segmentation on a text into a scenario where a new word is mined. Referring to FIG. 5, the method for mining a new word provided by the embodiment of the present disclosure includes the following.

A basic corpus preparation phase

A user retrieval text in a historical period of time is collected, a corpus is constructed, and a frequency of usage of the user retrieval text in the corpus is statisticized.

An extraction for a character fragment of at least one kind of length is performed on each user retrieval text in the corpus. Here, a maximum extraction length is determined according to a maximum length of a word.

A frequency at which a character fragment occurs in the corpus, a frequency at which the character fragment occurs as a sentence, an adjacent character of the character fragment and a frequency of occurrence of the adjacent character are statisticized.

After the each user retrieval text in the corpus is statisticized, the following information may be obtained.

<ngram, ngram pv, query pv, left words stat dict, right words stat dict>.

Ngram refers to a character fragment.

Ngram pv refers to a frequency at which the character fragment occurs as a local fragment, i.e., a total frequency at which the character fragment occurs in the corpus.

Query pv refers to a frequency at which the character fragment occurs as a user retrieval text, and represents the independent retrieval capability of the character fragment. The higher the frequency at which the character fragment occurs as the user retrieval text is, the higher the cohesiveness of the character fragment is.

Left words stat dict is a map type. Here, key is a previous adjacent character of the character fragment, and value is a frequency at which the character occurs as a character fragment.

Right words stat dict is also a map type. Here, key is a next adjacent character of the character fragment, and value is a frequency at which the character occurs as a character fragment.

Specifically, the left entropy or the right entropy of the character fragment is determined according to the following formula:

$$-\sum_{c \in C} \frac{pv(c \mid ngram)}{pv(ngram)} \log \frac{pv(c \mid ngram)}{pv(ngram)}.$$

If the left entropy of the character fragment is obtained, C refers to a previous adjacent character set of the character fragment; c is an element in C; pv(c|ngram) refers to a frequency of occurrence of the previous adjacent character c when a character fragment is given, and pv(ngram) refers to a total frequency of occurrence of the character fragment.

If the right entropy of the character fragment is obtained, C refers to a next adjacent character set of the character fragment; c is an element in C; pv(c|ngram) refers to a frequency of occurrence of the next adjacent character c when a character fragment is given, and pv(ngram) refers to a total frequency of occurrence of the character fragment.

In summary, the total frequency of occurrence of the character fragment, the frequency at which the character fragment occurs as an independent retrieval text, and the left entropy and the right entropy of the character fragment may be obtained.

A practical application phase

Character fragments of at least one kind of length is extracted from a to-be-mined target retrieval text, the extracted character fragments are combined, and a character fragment combination has an overlap is filtered. Here, if the combination of character fragments are insufficient to be stitched into the target retrieval text, a character in the target retrieval text, which does not enter into a character fragment, is supplemented.

A character fragment combination obtained through the filtering and including the minimum number of character fragments is used as a candidate fragment combination. If the number of candidate fragment combinations is 1, this character fragment combination is used as a current layer of character fragment combination. Otherwise, the candidate fragment combinations are scored based on the left entropy and the right entropy of character fragments in the candidate fragment combinations. The current layer of character fragment combination is determined from the candidate fragment combinations according to the scoring result. Here, the left entropy and the right entropy of the character fragments are acquired in the basic corpus preparation phase.

Specifically, there are many schemes of scoring the above candidate fragment combinations. Alternatively, the maximum entropy corresponding to the character fragment is determined, the product of maximum entropy of all character fragments in the candidate fragment combination is obtained, and the product is used as the scoring result of the candidate fragment combination. It is also possible to obtain the product of left entropy and right entropy of all the character fragments in the candidate fragment combination, and use the product as the scoring result of the candidate fragment combination.

Alternatively, the basis on which the candidate fragment combinations are scored may also be the historical frequency of occurrence of the character fragment and/or the frequency at which the character fragment occurs as an independent user retrieval text.

Segmentation and combining on character fragments in the current layer of character fragment combination are continued until the segmentation for a single character, to generate a hierarchical analysis tree of the target retrieval text.

A depth-first traversal is performed on the generated hierarchical analysis tree. When each subtree is traversed, a sub-root node and all child nodes thereof are scored. When the score for a parent node is greater than the comprehensive score of the child nodes, the traversal for the subtree is terminated, and the character fragment corresponding to the sub-root node is selected as the segmentation for the target retrieval text. When the score of the parent node is less than or equal to the comprehensive score of the child nodes, the depth-first traversal calculation continues to be performed downward.

Specifically, each node is scored according to the following formula:

log(query_pv).

Here, query_pv is a frequency at which each character fragment occurs as a user retrieval text.

The comprehensive score of the child nodes is the product of the scoring results of all the child nodes, and the scoring result of the parent node is based on the scoring for the parent node, and is the power of the number of the child nodes.

When the traversal for the entire hierarchical analysis tree is completed, a segmentation path of the target retrieval text may be obtained. Each character fragment in the segmentation path may be considered as a candidate word.

A series of features may be extracted from each candidate word: length, ngram pv, query pv, left entropy, right entropy, etc. Based on these features, a classifier may be trained to score whether the candidate word is a word entry.

Here, there are many kinds of data sources of training the classifier, which may be annotated manually or generated through triggering.

In some human-machine interaction scenarios, the slot data corresponding to a user retrieval text having a high satisfaction may be selected as annotation data for use.

According to the scoring results, a target segmentation word is determined from the candidate words.

A generated new word may be obtained by comparing, in a collection, target segmentation words at different time.

According to the embodiment of the present disclosure, through the statistics on a large scale of user retrieval texts, an entropy based hierarchical analysis tree of a user retrieval text is constructed, and the path traversal is performed on the hierarchical analysis tree of the user retrieval text based on the frequency at which the character fragment occurs as an independent user retrieval text, to obtain the segmentation result of the user retrieval text.

The embodiment of the present disclosure is independent of a word segmentation tool, and an analysis result may be combined with an existing word segmentation tool, and may be used for a detection for a segmentation boundary error, a discovery for a new word, and the like.

Fifth Embodiment

Figure 6:
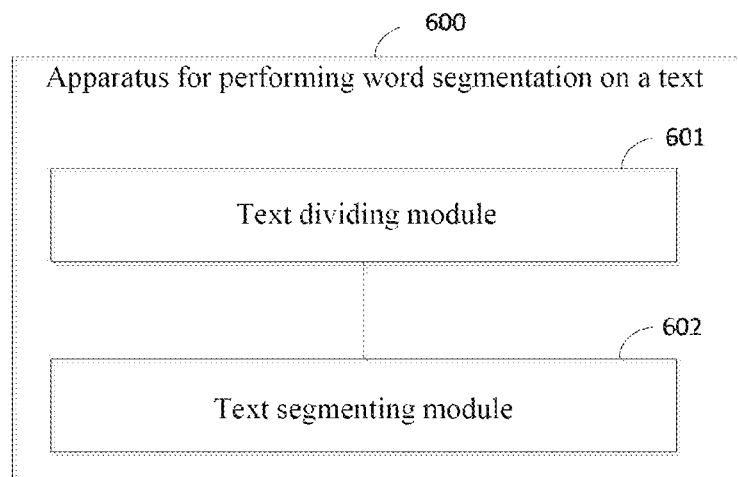
FIG. 6 is a schematic structural diagram of an apparatus for performing word segmentation on a text provided by a fifth embodiment of the present disclosure.

FIG. 6 is a schematic structural diagram of an apparatus for performing word segmentation on a text provided by a fifth embodiment of the present disclosure. Referring to FIG. 6, the apparatus 600 for performing word segmentation on a text provided by the embodiment of the present disclosure includes a text dividing module 601 and a text segmenting module 602.

Here, the text dividing module 601 is configured to divide a to-be-segmented text into at least two layers of character fragment combinations. Here, any layer of character fragments are child character fragments of a previous layer of character fragments and/or parent character fragments of a next layer of character fragments.

The text segmenting module 602 is configured to segment the to-be-segmented text according to a target word granularity based on the at least two layers of character fragment combinations.

According to the embodiment of the present disclosure, the to-be-segmented text is divided into at least two layers of character fragment combinations, and the to-be-segmented text is segmented according to the target word granularity based on the at least two layers of character fragment combinations. Since the lengths of character fragments in each layer of character fragment combination are different, according to the embodiment of the present disclosure, segmentation of different word granularities on the to-be-segmented text may be implemented based on the divided at least two layers of character fragment combinations.

Further, the text segmenting module includes: a fragment extracting unit, configured to extract candidate character fragments of at least one kind of length from a previous layer of character fragments, the previous layer of character fragments belonging to a previous layer of character fragments; a fragment combining unit, configured to combine the extracted candidate character fragments to obtain candidate character fragment combinations; and a combination determining unit, configured to determine a combination of current layers of character fragments from the candidate character fragment combinations according to an overlapping relationship between the candidate character fragments and historical usage information of the candidate character fragments, the current layer of character fragment combination including at least one character fragment of the current layer.

Further, the combination determining unit includes: a combination filtering subunit, configured to filter a candidate character fragment combination having an overlap from the candidate character fragment combinations, to obtain a target character fragment combination; and a combination determining subunit, configured to determine the current layer of character fragment combination from the target character fragment combinations according to the number of candidate character fragments included in the target character fragment combinations and historical usage information of the candidate character fragments.

Further, the combination determining subunit is specifically configured to: calculate an information entropy of the candidate character fragments according to historical adjacent character information of the candidate character fragments; determine weights of the target character fragment combinations according to the calculated information entropy; and determine the current layer of character fragment combination from the target character fragment combinations according to the number of the candidate character fragments included in the target character fragment combinations and the weights of the target character fragment combinations.

Further, the text segmenting module includes: a segmentation fragment determining unit, configured to determine target segmentation fragments from the character fragment combinations according to historical usage information of character fragments in the character fragment combinations and a parent-child relationship between character fragments in different character fragment combinations; and a text segmenting unit, configured to combine the target segmentation fragments, and segment the to-be-segmented text according to the target word granularity based on the combination of target segmentation fragments.

Further, the segmentation fragment determining unit includes: a first weight subunit, configured to determine, according to historical usage information of a parent character fragment in the character fragment combinations, a weight of the parent character fragment; a second weight subunit, configured to determine, according to historical usage information of a child character fragment associated with the parent character fragment, a comprehensive weight of the child character fragment; and a segmentation fragment determining subunit, configured to compare the weight of the parent character fragment with the comprehensive weight of the child character fragment; and terminate a traversal for a branch to which the parent character fragment belongs and use the child character fragment associated with the parent character fragment as the target segmentation fragment, in response to the weight of the parent character fragment is greater than the comprehensive weight of the child character fragment.

Further, the apparatus further includes: a word comparing module, configured to, after the to-be-segmented text is segmented, compare a target segmentation word obtained through the segmentation with an existing segmentation word, the existing segmentation word being obtained by segmenting the to-be-segmented text based on an existing word segmentation logic; and a word mining module, configured to determine a to-be-mined word from the target segmentation word according to the comparison result.

Sixth Embodiment

According to an embodiment of the present disclosure, the present disclosure further provides an electronic device and a readable storage medium.

Figure 7:
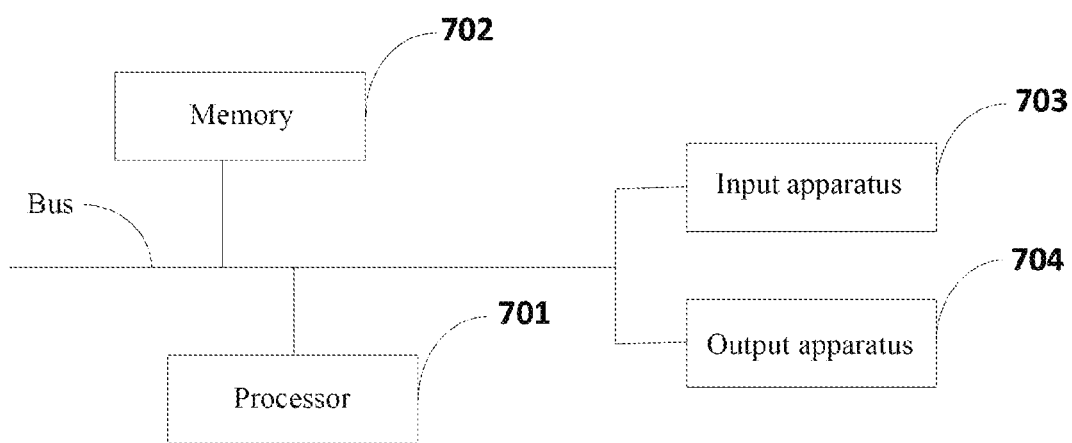
FIG. 7 is a block diagram of an electronic device of the method for performing word segmentation on a text according to embodiments of the present disclosure.

As shown in FIG. 7, FIG. 7 is a block diagram of an electronic device of the method for performing word segmentation on a text according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 7, the electronic device includes one or more processors 701, a memory 702, and an interface for connecting parts, the interface including a high speed interface and a low speed interface. The components are interconnected using different buses, and may be mounted on a common motherboard or in other ways as needed. The processors may process instructions executed within the electronic device, the instructions including instructions stored in the memory or on the memory to display graphical information of a GUI on an external input/output apparatus such as a display device coupled to the interface. In other implementations, a plurality of processors and/or a plurality of buses may be used, if desired, along with a plurality of memories. Also, a plurality of electronic devices may be connected, and each device provides a portion of necessary operations (e.g., as a server bank, a group of blade servers or a multi-processor system). In FIG. 7, one processor 701 is taken as an example.

The memory 702 is a non-transitory computer readable storage medium provided in the present disclosure. Here, the memory stores instructions executable by at least one processor, to cause the at least one processor to perform the method for performing word segmentation on a text provided in the present disclosure. The non-transitory computer readable storage medium in the present disclosure stores computer instructions, the computer instructions being used to cause a computer to perform the method for performing word segmentation on a text provided in the present disclosure.

As a non-transitory computer readable storage medium, the memory 702 may be used to store a non-transitory software program, a non-transitory computer executable program and a module such as a program instruction/module (e.g., the text dividing module 601 and the text segmenting module 602 shown in FIG. 6) corresponding to the method for performing word segmentation on a text in the embodiments of the present disclosure. The processor 701 executes various functional applications and data processing of the server by running the non-transitory software programs, the instructions and the modules stored in the memory 702, i.e., implements the method for performing word segmentation on a text in the above embodiments of the method.

The memory 702 may include a storage program area and a storage data area. Here, the storage program area may store an operating system and an application program required for at least one function. The storage data area may store data, etc. created according to the use of the electronic device of performing word segmentation on a text. In addition, the memory 702 may include a high speed random access memory, and may also include a non-transitory memory, for example, at least one magnetic disk storage device, a flash storage device, or other non-transitory solid state storage devices. In some embodiments, the memory 702 may alternatively include a storage device disposed remotely relative to the processor 701. The remote storage device may be connected to the electronic device of performing word segmentation on a text via a network. Examples of such network include, but not limited to, the Internet, an enterprise intranet, a block chain network, a local area network, a mobile communication network, and a combination thereof.

The electronic device of the method for performing word segmentation on a text may further include: an input apparatus 703 and an output apparatus 704. The processor 701, the memory 702, the input apparatus 703 and the output apparatus 704 may be connected via a bus or in other ways. In FIG. 7, the connection via a bus is taken as an example.

The input apparatus 703 may receive an inputted number or inputted character information, and generate a key signal input related to the user setting and functional control of the electronic device of performing word segmentation on a text. For example, the input apparatus is a touch screen, a keypad, a mouse, a track pad, a touch pad, a pointing stick, one or more mouse buttons, a track ball, a joystick, or the like. The output apparatus 704 may include a display device, an auxiliary lighting apparatus (e.g., LED), a tactile feedback apparatus (e.g., a vibration motor), etc. The display device may include, but not limited to, a Liquid Crystal Display (LCD), a Light Emitting Diode (LED) display, and a plasma display. In some embodiments, the display device may be a touch screen.

Various implementations of the systems and techniques described herein may be implemented in a digital electronic circuit system, an integrated circuit system, an Application Specific Integrated Circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or object-oriented programming language, and/or an assembly/machine language. As used herein, the terms "machine readable medium" and "computer readable medium" refer to any computer program product, device and/or apparatus (e.g., a magnetic disk, an optical disk, a storage device and a Programmable Logic Device (PLD)) used to provide a machine instruction and/or data to the programmable processor, including a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a CRT (Cathode Ray Tube) or an LCD (Liquid Crystal Display) monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN), the Internet and a block chain network.

The computer system may include a client and a server. The client and the server are generally remote from each other and typically interact through the communication network. The relationship between the client and the server is generated through computer programs running on the respective computer and having a client-server relationship to each other.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

The above embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for performing word segmentation on a text, comprising:
    dividing a to-be-segmented text into at least two layers of character fragment combinations, any layer of character fragments being child character fragments of a previous layer of character fragments and/or parent character fragments of a next layer of character fragments; and
    segmenting the to-be-segmented text according to a target word granularity based on the at least two layers of character fragment combinations;
    wherein the dividing the to-be-segmented text into at least two layers of character fragment combinations comprises:
        extracting candidate character fragments of at least one kind of length from the previous layer of character fragments, the previous layer of character fragments belonging to a previous layer of character fragment combination;
        combining the extracted candidate character fragments to obtain candidate character fragment combinations; and
        determining a current layer of character fragment combination from the candidate character fragment combinations according to an overlapping relationship between the candidate character fragments and historical usage information of the candidate character fragments, the current layer of character fragment combination including at least one character fragment of the current layer.

2. The method according to claim 1, wherein the determining the current layer of character fragment combination from the candidate character fragment combinations according to the overlapping relationship between the candidate character fragments and historical usage information of the candidate character fragments comprises:
    filtering a candidate character fragment combination having an overlap from the candidate character fragment combinations, to obtain target character fragment combinations; and
    determining the current layer of character fragment combination from the target character fragment combinations according to a number of candidate character fragments included in the target character fragment combinations and historical usage information of the candidate character fragments.

3. The method according to claim 2, wherein the determining the current layer of character fragment combination from the target character fragment combinations according to the number of candidate character fragments included in the target character fragment combinations and historical usage information of the candidate character fragments comprises:
    calculating an information entropy of the candidate character fragments according to historical adjacent character information of the candidate character fragments;
    determining weights of the target character fragment combinations according to the calculated information entropy; and
    determining the current layer of character fragment combination from the target character fragment combinations according to the number of the candidate character fragments included in the target character fragment combinations and the weights of the target character fragment combinations.

4. The method according to claim 1, wherein the segmenting the to-be-segmented text according to the target word granularity based on the at least two layers of character fragment combinations comprises:
    determining target segmentation fragments from character fragments of the character fragment combinations according to historical usage information of character fragments in the character fragment combinations and a parent-child relationship between character fragments in different character fragment combinations; and
    combining the target segmentation fragments, and segmenting the to-be-segmented text according to the target word granularity based on the combination of target segmentation fragments.

5. The method according to claim 4, wherein the determining target segmentation fragments from character fragments of the character fragment combinations according to historical usage information of character fragments in the character fragment combination and a parent-child relationship between character fragments in different character fragment combinations comprises:
  determining, according to historical usage information of a parent character fragment in the character fragment combinations, a weight of the parent character fragment;
  determining, according to historical usage information of a child character fragment associated with the parent character fragment, a comprehensive weight of the child character fragment; and
  comparing the weight of the parent character fragment with the comprehensive weight of the child character fragment; and terminating a traversal for a branch to which the parent character fragment belongs and using the child character fragment associated with the parent character fragment as the target segmentation fragment, in response to the weight of the parent character fragment is greater than the comprehensive weight of the child character fragment.

6. The method according to claim 1, wherein after segmenting the to-be-segmented text, the method further comprises:
  comparing a target segmentation word obtained through the segmentation with an existing segmentation word, the existing segmentation word being obtained by segmenting the to-be-segmented text based on an existing word segmentation logic; and
  determining a to-be-mined word from the target segmentation word according to a comparison result.

7. An electronic device, comprising:
  at least one processor; and
  a memory, communicatively connected with the at least one processor,
  wherein the memory stores instructions executable by the at least one processor, and the instructions when executed by the at least one processor, cause the at least one processor to perform operations, the operations comprising:
    dividing a to-be-segmented text into at least two layers of character fragment combinations, any layer of character fragments being child character fragments of a previous layer of character fragments and/or parent character fragments of a next layer of character fragments; and
    segmenting the to-be-segmented text according to a target word granularity based on the at least two layers of character fragment combinations;
  wherein the dividing the to-be-segmented text into at least two layers of character fragment combinations comprises:
    extracting candidate character fragments of at least one kind of length from the previous layer of character fragments, the previous layer of character fragments belonging to a previous layer of character fragment combination;
    combining the extracted candidate character fragments to obtain candidate character fragment combinations; and
    determining a current layer of character fragment combination from the candidate character fragment combinations according to an overlapping relationship between the candidate character fragments and historical usage information of the candidate character fragments, the current layer of character fragment combination including at least one character fragment of the current layer.

8. The electronic device according to claim 7, wherein the determining the current layer of character fragment combination from the candidate character fragment combinations according to the overlapping relationship between the candidate character fragments and historical usage information of the candidate character fragments comprises:
  filtering a candidate character fragment combination having an overlap from the candidate character fragment combinations, to obtain target character fragment combinations; and
  determining the current layer of character fragment combination from the target character fragment combinations according to a number of candidate character fragments included in the target character fragment combinations and historical usage information of the candidate character fragments.

9. The electronic device according to claim 8, wherein the determining the current layer of character fragment combination from the target character fragment combinations according to the number of candidate character fragments included in the target character fragment combinations and historical usage information of the candidate character fragments comprises:
  calculating an information entropy of the candidate character fragments according to historical adjacent character information of the candidate character fragments;
  determining weights of the target character fragment combinations according to the calculated information entropy; and
  determining the current layer of character fragment combination from the target character fragment combinations according to the number of the candidate character fragments included in the target character fragment combinations and the weights of the target character fragment combinations.

10. The electronic device according to claim 7, wherein the segmenting the to-be-segmented text according to the target word granularity based on the at least two layers of character fragment combinations comprises:
  determining target segmentation fragments from character fragments of the character fragment combinations according to historical usage information of character fragments in the character fragment combinations and a parent-child relationship between character fragments in different character fragment combinations; and
  combining the target segmentation fragments, and segmenting the to-be-segmented text according to the target word granularity based on the combination of target segmentation fragments.

11. The electronic device according to claim 10, wherein the determining target segmentation fragments from character fragments of the character fragment combinations according to historical usage information of character fragments in the character fragment combination and a parent-child relationship between character fragments in different character fragment combinations comprises:
  determining, according to historical usage information of a parent character fragment in the character fragment combinations, a weight of the parent character fragment;

determining, according to historical usage information of a child character fragment associated with the parent character fragment, a comprehensive weight of the child character fragment; and comparing the weight of the parent character fragment with the comprehensive weight of the child character fragment; and terminating a traversal for a branch to which the parent character fragment belongs and using the child character fragment associated with the parent character fragment as the target segmentation fragment, in response to the weight of the parent character fragment is greater than the comprehensive weight of the child character fragment.

12. The electronic device according to claim 7, wherein after segmenting the to-be-segmented text, the operations further comprise:

comparing a target segmentation word obtained through the segmentation with an existing segmentation word, the existing segmentation word being obtained by segmenting the to-be-segmented text based on an existing word segmentation logic; and determining a to-be-mined word from the target segmentation word according to a comparison result.

13. A non-transitory computer readable storage medium, storing computer instructions, wherein the computer instructions when executed by a computer, cause the computer to perform operations, the operations comprising:

dividing a to-be-segmented text into at least two layers of character fragment combinations, any layer of character fragments being child character fragments of a previous layer of character fragments and/or parent character fragments of a next layer of character fragments; and segmenting the to-be-segmented text according to a target word granularity based on the at least two layers of character fragment combinations;

wherein the dividing the to-be-segmented text into at least two layers of character fragment combinations comprises:

extracting candidate character fragments of at least one kind of length from the previous layer of character fragments, the previous layer of character fragments belonging to a previous layer of character fragment combination;

combining the extracted candidate character fragments to obtain candidate character fragment combinations; and determining a current layer of character fragment combination from the candidate character fragment combinations according to an overlapping relationship between the candidate character fragments and historical usage information of the candidate character fragments, the current layer of character fragment combination including at least one character fragment of the current layer.

* * * * *

UNITED STATES PATENT AND TRADEMARK OFFICE
CERTIFICATE OF CORRECTION

| | | |
|---|---|---|
| PATENT NO. | : 11,468,236 B2 | Page 1 of 1 |
| APPLICATION NO. | : 17/020166 | |
| DATED | : October 11, 2022 | |
| INVENTOR(S) | : Dongmin Ma et al. | |

It is certified that error appears in the above-identified patent and that said Letters Patent is hereby corrected as shown below:

On the Title Page

Item (73), "BAIDU ONLINE NETWORK TECHNOLOGY (BEIJING) CO., LTD., Beijing (CN)" should read: --BAIDU ONLINE NETWORK TECHNOLOGY (BEIJING) CO., LTD., Beijing (CN); SHANGHAI XIAODU TECHNOLOGY CO. LTD., Shanghai (CN)--.

Signed and Sealed this
Ninth Day of May, 2023

Katherine Kelly Vidal
*Director of the United States Patent and Trademark Office*